US012567753B2

(12) United States Patent
Shen et al.

(10) Patent No.: US 12,567,753 B2

(45) Date of Patent: *Mar. 3, 2026

(54) REVERSIBLE CHARGING CRADLE ADAPTER SYSTEMS

(71) Applicant: ZEBRA TECHNOLOGIES CORPORATION, Lincolnshire, IL (US)

(72) Inventors: Mu-Kai Shen, Taipei (TW); Liao-Hsun Chen, Keelung City (TW); Chao Yu Chang, Taipei (TW)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,543

(22) Filed: May 1, 2024

(65) Prior Publication Data

US 2024/0283265 A1 Aug. 22, 2024

Related U.S. Application Data

(63) Continuation of application No. 17/547,896, filed on Dec. 10, 2021, now Pat. No. 12,003,128.

(51) Int. Cl.
*H01M 10/46* (2006.01)
*H02J 7/00* (2006.01)

(52) U.S. Cl.
CPC .................................. *H02J 7/0044* (2013.01)

(58) Field of Classification Search
CPC ....... H02J 7/0042; H02J 7/0044; H02J 7/0045
USPC .................................. 320/107, 110, 114, 115
See application file for complete search history.

(56) References Cited

U.S. PATENT DOCUMENTS

| | | | |
|---|---|---|---|
| 8,068,336 B2 | 11/2011 | Crooijmans et al. | |
| 12,003,128 B2 * | 6/2024 | Shen ..................... | H02J 7/0042 |
| 2006/0121953 A1 | 6/2006 | Park | |
| 2009/0295328 A1 | 12/2009 | Griffin, Jr. | |
| 2010/0134984 A1 | 6/2010 | Lum | |

(Continued)

FOREIGN PATENT DOCUMENTS

| | | |
|---|---|---|
| CA | 3030709 A1 | 6/2020 |
| GB | 2469169 A | 10/2010 |
| WO | 2018/132215 A1 | 7/2018 |

OTHER PUBLICATIONS

International Search Report and Written Opinion for International Application PCT/US2022/046250 mailed on Jan. 20, 2023.

*Primary Examiner* — Edward Tso

(57) ABSTRACT

An adapter for a charging cradle includes: a perimeter wall defining a channel between first and second ends; a first device interface on an inner surface of the perimeter wall in communication with the first end, the first device interface configured to receive and align a first mobile device configuration with the charging cradle; a second device interface on the inner surface of the perimeter wall in communication with the second end, the second device interface configured to receive and align a second mobile device configuration with the charging cradle; a cradle interface on an outer surface of the perimeter wall, and configured to couple the adapter to the charging cradle in one of (i) a first orientation to expose a connector of the charging cradle via the first end of the channel, and (ii) a second orientation to expose the connector via the second end of the channel.

5 Claims, 8 Drawing Sheets

(56) References Cited

U.S. PATENT DOCUMENTS

| | | | |
|---|---|---|---|
| 2014/0063703 | A1 | 3/2014 | Kim et al. |
| 2014/0167675 | A1 | 6/2014 | Armstrong |
| 2017/0371374 | A1 | 12/2017 | Carnevali |
| 2019/0081508 | A1 | 3/2019 | Laird |

* cited by examiner

REVERSIBLE CHARGING CRADLE ADAPTER SYSTEMS

CROSS-REFERENCE TO RELATED APPLICATIONS

This application is a continuation of U.S. patent application Ser. No. 17/547,896, filed Dec. 10, 2021, the entire contents of which is incorporated herein by reference.

BACKGROUND

Devices such as tablet computers, smart phones, and the like, may include rechargeable batteries and/or external communications interfaces such as Universal Serial Bus (USB) ports, and the like. Such devices may be placed into cradles with charging and/or communication capabilities, e.g., to recharge the above-mentioned batteries, exchange data with the devices, and the like. The devices may have a wide variety of shapes and/or sizes, which may necessitate a corresponding variety of cradles to accommodate.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
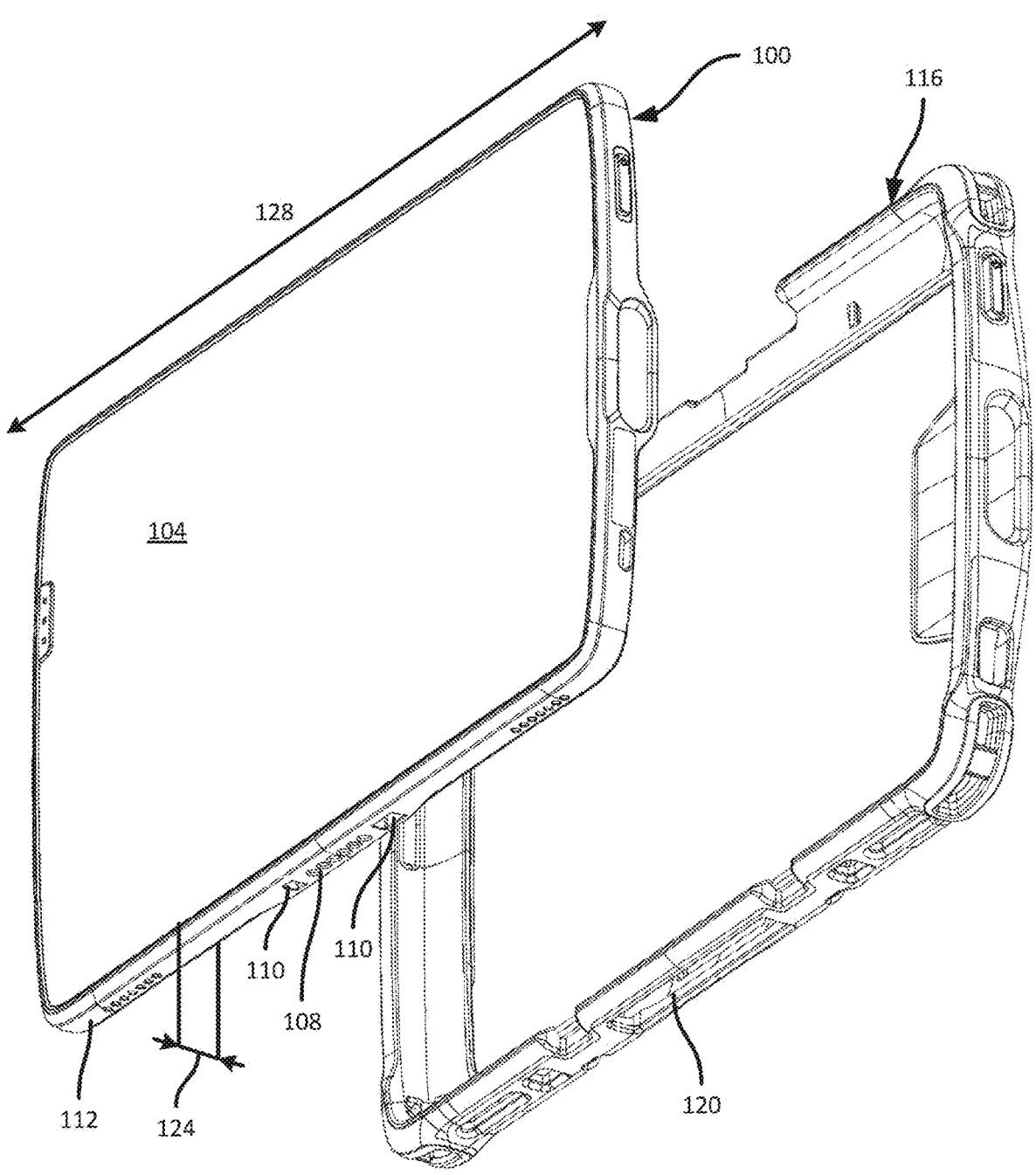
FIG. 1 is a diagram illustrating an exploded view of a mobile computing device and a corresponding cover.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to adapter for a charging cradle including: a perimeter wall defining a chan-nel between first and second ends; a first device interface on an inner surface of the perimeter wall in communication with the first end, the first device interface configured to receive and align a first mobile device configuration with the charging cradle; a second device interface on the inner surface of the perimeter wall in communication with the second end, the second device interface configured to receive and align a second mobile device configuration with the charging cradle; a cradle interface on an outer surface of the perimeter wall, and configured to couple the adapter to the charging cradle in one of (i) a first orientation to expose a connector of the charging cradle via the first end of the channel, and (ii) a second orientation to expose the connector via the second end of the channel.

Additional examples disclosed herein are directed to a system, comprising: a charging cradle including a channel with a connector disposed therein; and an adapter including: a perimeter wall defining a channel extending between an open first end and an opposing open second end; a first device interface on an inner surface of the perimeter wall in communication with the first end of the channel, the first device interface configured to receive and align a first mobile device configuration with the charging cradle; a second device interface on the inner surface of the perimeter wall in communication with the second end of the channel, the second device interface configured to receive and align a second mobile device configuration with the charging cradle; a cradle interface on an outer surface of the perimeter wall, and configured to couple the adapter to the charging cradle in one of (i) a first orientation to expose the connector of the charging cradle via the first end of the channel, and (ii) a second orientation to expose the connector via the second end of the channel.

FIG. 1 illustrates a mobile computing device 100, such as a tablet computer. The device 100 includes a housing supporting various other components of the device 100, such as a display 104. The housing also supports internal components of the device 100, such as a processor, data storage devices, and the like. The housing can also support a rechargeable battery configured to supply electrical power to the display 104 and other components of the device 100. As will be apparent to those skilled in the art, the battery can be recharged by supplying electrical power to the device 100 from an external source. In some implementations, the external source includes a charging cradle. Cradles can include either or both of electrical power supply for the device 100, and data communications capabilities, e.g., enabling the device 100 to communicate with another computing device (not shown) via the cradle.

The device 100 includes a connector 108 on an exterior surface thereof, enabling the device 100 to receive electrical power from a cradle as mentioned above, and/or establish communications via such a cradle. The connector 108, in this example, is located on a bottom edge 112 of the device 100. The connector 108 can have a wide variety of forms, including a set of electrical contacts as shown in FIG. 1, e.g., to engage with corresponding pogo pins of a cradle. In other examples, the connector 108 can include a port (e.g., a USB type-C port, or the like), configured to engage with a corresponding connector of the cradle. In some examples, as illustrated, the device 100 can include one or more locating recesses 110 adjacent to the connector 108, to assist an operator in aligning the connector 108 with a corresponding connector on the cradle.

To recharge and/or establish communications via a cradle, the device 100 is supported relative to the cradle such that the connector 108 is aligned with a corresponding connector of the cradle. As will be apparent to those skilled in the art, motion of the device 100 relative to the cradle may lead to an interrupted connection between device and cradle, and/or may damage the connector 108 or the corresponding connector of the cradle. The cradle can therefore include various guide surfaces or other structural elements to restrict movement of the device 100 when the device 100 is placed on the cradle. Such structural elements, however, may prevent the cradle from engaging with different devices, or with the device 100 when equipped with certain accessories.

In particular, the device 100 can be operated, or in an assembly including a protective cover 116, also referred to as an exoskeleton. The assembly of the cover 116 with the device 100 may be referred to as one device configuration. In other examples, the device 100 can be operated in another configuration, without the cover 116 (i.e., the device 100 alone). The cover 116 includes an opening 120 that exposes the connector 108 when the cover 116 is secured to the housing of the device 100. However, despite the connector 108 remaining exposed, a device configuration including the device 100 with the cover 116 affixed thereto may nevertheless be incompatible with some cradles, because the external profile of such a configuration is sufficiently different from the external profile of the device 100 alone that the structural elements of the cradle mentioned above may be unable to receive the assembly of the device 100 with the cover 116.

Figure 2:
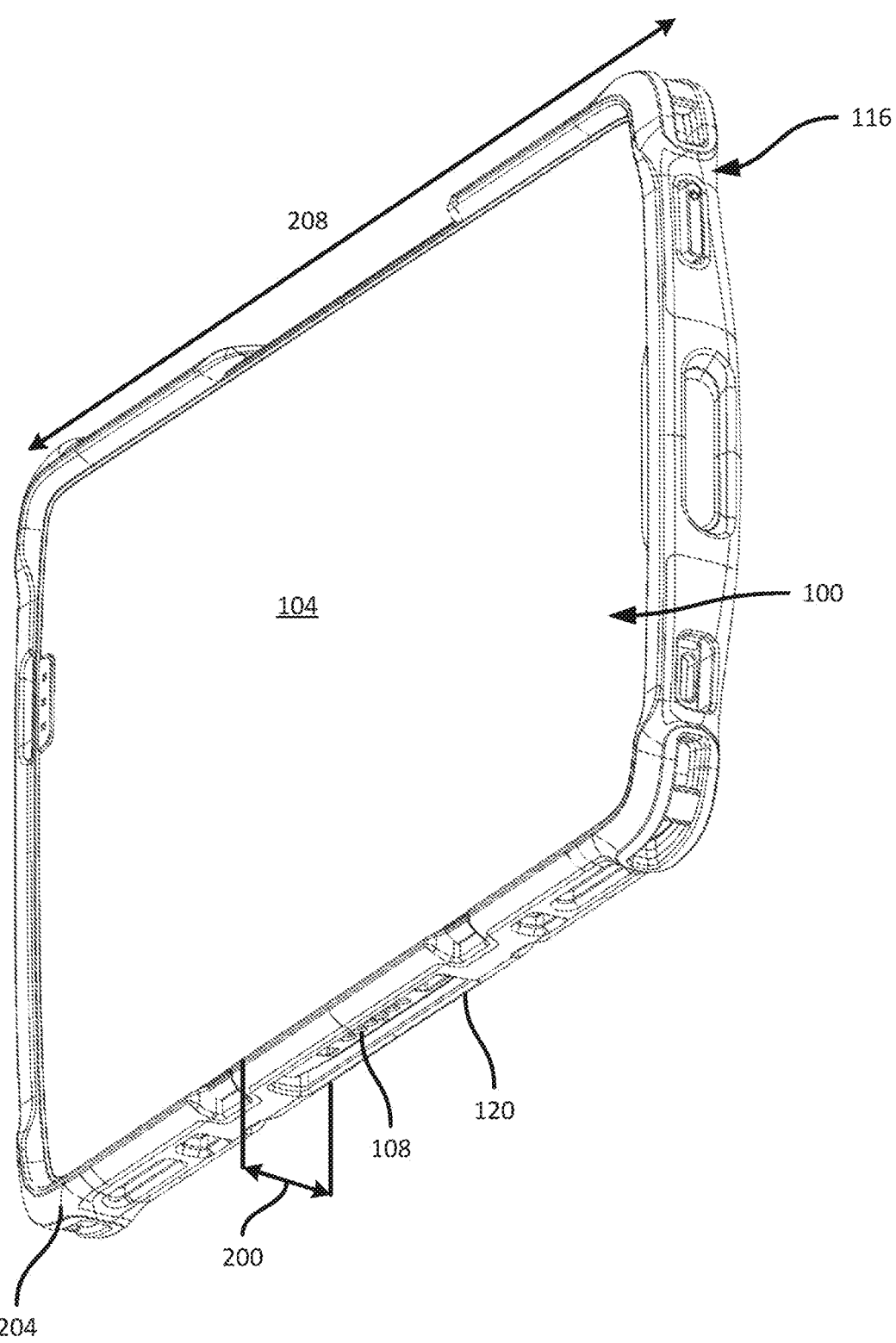
FIG. 2 is a diagram illustrating the device and cover of FIG. 1 in an assembled state.

For example, the external profile of the device 100 alone (i.e., without the cover 116) can be defined in part by external dimensions of the device 100, such as a thickness 124 of the device 100 at the bottom edge 112, a length 128 of the device 100, and the like. Turning to FIG. 2, the external profile of the device 100 with the cover 116 installed is defined by a thickness 200 of a bottom edge 204 of the cover 116, which is larger than the thickness 124. In addition, the external profile of the device 100 with the cover 116 may be defined by a length 208 that is greater than the length 128. As will be apparent to those skilled in the art, various other external attributes may distinguish the assembly consisting of the device 100 and the cover 116 from the configuration consisting of the device 100 alone.

The differences between the thicknesses 124 and 200, the lengths 128 and 208, and/or other attributes as mentioned above, may prevent some cradles from accommodating the device 100 alone as well as the device 100 with the cover 116. Instead, multiple cradles may be deployed to accommodate the different mobile device configurations mentioned above. Deploying multiple cradles, e.g., with distinct physical configurations adapted to distinct device configurations, however, may increase the cost and complexity associated with a fleet of devices such as the device 100.

Figure 3:
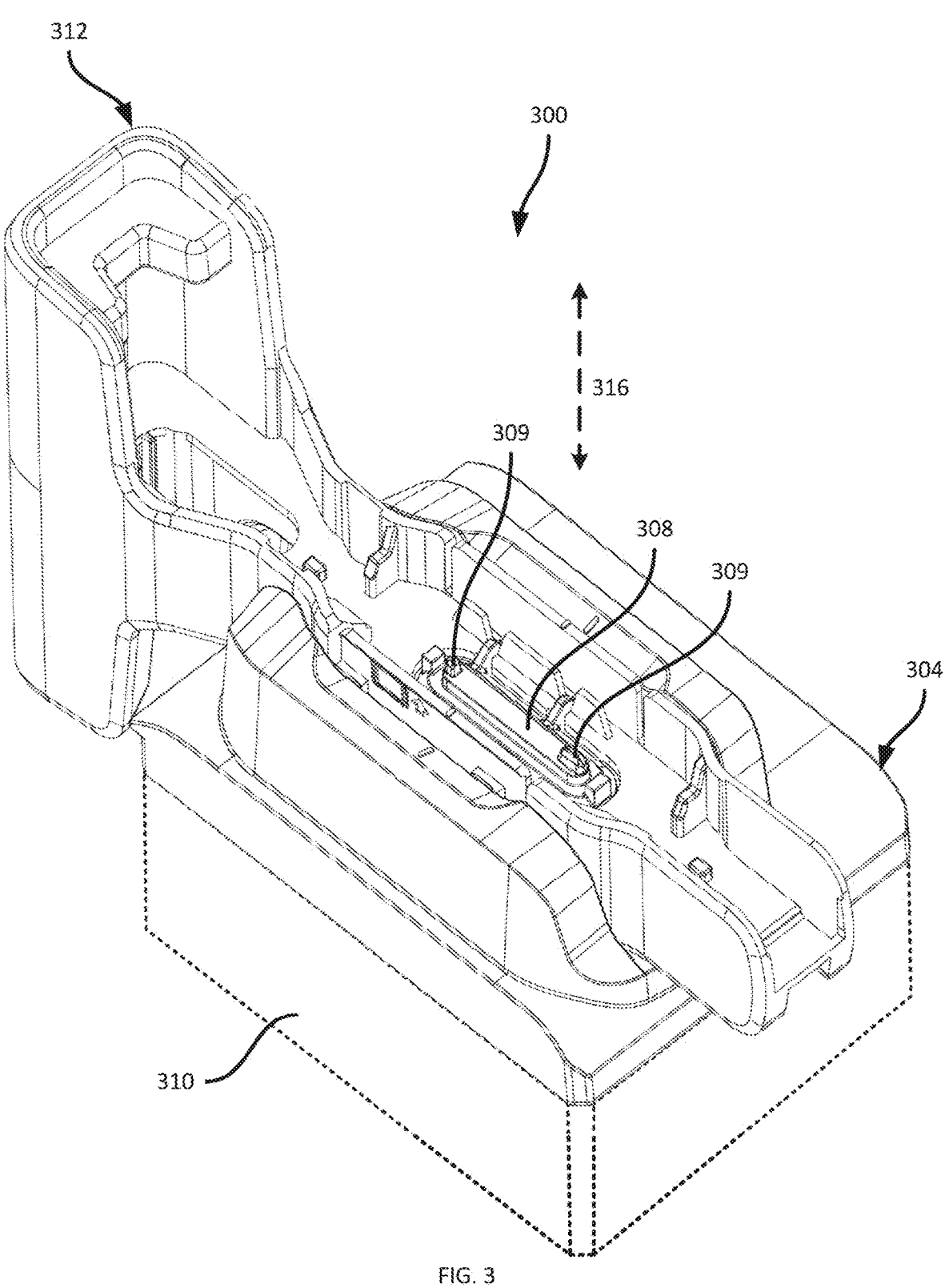
FIG. 3 is a diagram of a reversible charging cradle adapter system.

FIG. 3 illustrates a reversible charging cradle adapter system 300. The system 300 enables a cradle 304 to accommodate more than one device configuration. For example, the system 300 enables the cradle 304 to accommodate both the device 100 alone, and an assembly including the device 100 with the cover 116 installed. In general, as discussed in detail below, the cradle 304 includes a connector 308 configured to engage with the connector 108 of the device 100, to supply power to the device 100 and/or enable communication between the device 100 and another computing device (not shown). The connector 308 can include locating posts 309 or other protrusions configured to engage with the recesses 110 of the device 100 shown in FIG. 1. The cradle 304 can be installed on a cradle base 310 containing electrical supply hardware and the like. In some examples, the base 310 supports a plurality of cradles having the features described herein in connection with the cradle 304. That is, the base 310 can be elongated relative to the illustration of FIG. 3, and include distinct interfaces for multiple cradles 304.

The system 300 also includes at least one adapter 312. Rather than being structurally configured to align and restrict movement of device 100 itself, whether alone or in combination with the cover 116, the cradle 304 is structurally configured to align and retain the adapter 312. The adapter 312, in turn, includes structural elements defining a cradle interface enabling the adapter 312 to removably couple with the cradle 304 in a manner that restricts movement of the adapter 312 relative to the cradle 304. Further, the adapter 312 includes distinct device interfaces, each configured to receive and align distinct device configurations (e.g., the device 100 alone, and the device 100 with the cover 116) relative to the cradle 304. In other words, the adapter 312 provides a structural intermediary between the cradle 304 and more than one device configuration. The adapter 312 is removable from the cradle 304, and can be connected to the cradle 304 in distinct orientations. In each orientation, one of the above-mentioned device interfaces is active, while the other device interface is inactive. The active one of the device interfaces aligns the device 100 with the cradle 304 such that the connectors 108 and 308 are brought into contact. The active one of the device interfaces also restricts movement of the device 100, e.g. substantially eliminating movement of the device 100 in directions other than a direction 316, in which the device 100 is inserted and removed into and from the cradle 304. The direction 316 is generally a vertical direction when the system 300 is in use.

Figure 4:
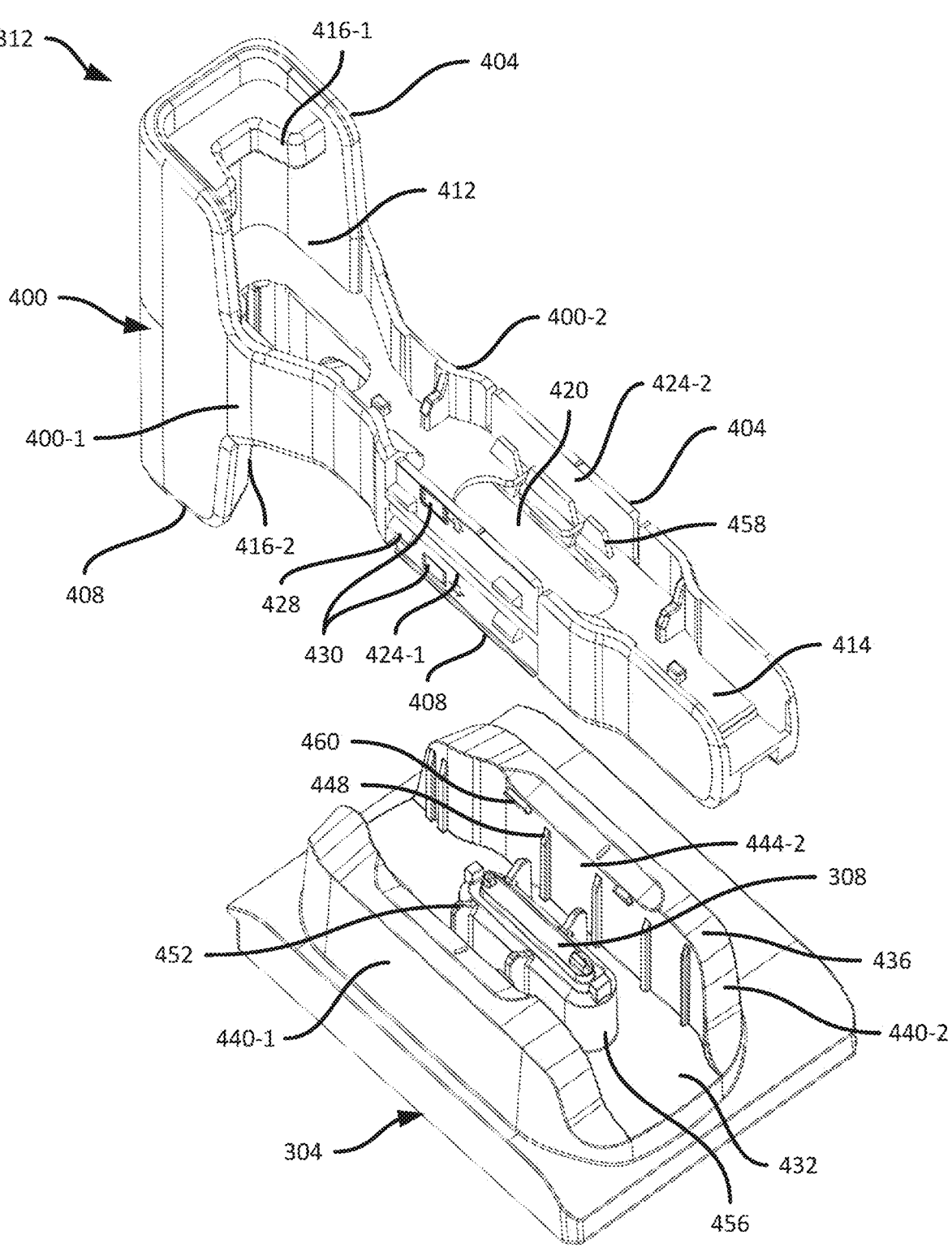
FIG. 4 is a diagram illustrating an exploded view of the system of FIG. 3.

Turning to FIG. 4, the adapter 312 is shown separated from the cradle 304. The adapter 312 includes a perimeter wall 400, defining a perimeter of the adapter 312. The perimeter wall 400 includes, in the illustrated example, first and second side walls 400-1 and 400-2, and extends between an open first end 404 and an open second end 408 of the adapter 312. The perimeter wall 400 also defines a channel 412 extending between the ends 404 and 408. As will be apparent in the discussion below, distinct portions of the channel 412 are configured to receive the device 100 (with or without the cover 116, depending on the portion of the channel 412). The portions of the channel 412 may be divided by a boundary wall 414 extending between the perimeter walls 400-1 and 400-2, and substantially perpendicular to the perimeter walls 400-1 and 400-2.

More specifically, the adapter 312 includes a first device interface on an inner surface of the perimeter wall 400, in communication with the first end 404 (e.g., in a portion of the channel 412 adjacent to the first end 404), and a second device interface on an inner surface of the perimeter wall 400 in communication with the second end 408. The device interfaces, in other words, are in opposing portions of the channel 412, and are exposed via opposite ends of the perimeter wall 400. In general, each device interface is configured to receive and align a respective device configuration (e.g., the device 100 alone, and the device 100 with the cover 116 installed) with the charging cradle 304.

In the illustrated example, each device interface includes an engagement surface with a respective surface profile. In particular, a first device interface includes an engagement surface 416-1 extending into the channel 412 and having a profile that matches an external profile of at least a portion of the corresponding device configuration. In this example, the profile of the surface 416-1 matches the external profile of the device 100 with the cover 116 installed, as will be illustrated later. The second device interface, meanwhile, includes an engagement surface 416-2 extending into the channel 412 and having a profile that matches an external profile of at least a portion of another device configuration (in this case, the device 100 alone). Each device interface can also include other structural features, as will be discussed in greater detail further below. As seen in FIG. 4, the portion of the adapter 312 including the engagement surfaces 416 can have a greater length (i.e., the distance between the ends 404 and 408) than the remaining portion of the adapter 312, such that the adapter 312 is generally T-shaped. In the illustrated embodiment, the engagement surfaces 416 are at a common side of the adapter 312, defining the T-shape of the adapter 312. In other examples, the engagement surfaces 416 of each interface can be at opposite sides of the adapter 312, resulting in an S-shaped adapter. In still other examples, the adapter 312 can include elongated portions with engagement surfaces 416 at both sides thereof, resulting in an H-shaped adapter.

The adapter 312 can be removably coupled to the cradle 304 in one of two orientations. In each orientation, one device interface is active and able to receive the device 100. In the orientation shown in FIG. 4 (which is also the orientation shown in FIG. 3), the first device interface, including the engagement surface 416-1, is in the active position. That is, the end 404 adjacent to the engagement surface 416-1 faces outwards (e.g., upwards) from the cradle 304, and the connector 308 of the cradle 304 is exposed to the first end 404 of the channel 412, via an opening 420 in the boundary wall 414. When the adapter 312 is coupled to the cradle 304 in the orientation shown in FIG. 4, the first device interface is therefore enabled to receive the device 100 via the first end 404 of the channel 412, and align connector 108 with the connector 308. In the illustrated orientation, the second device interface, on the other hand, is inactive, in that the second end 408 of the channel 412 faces downwards, towards the cradle 304. The connector 308 is therefore not exposed to the second end 408, and the device 100 cannot be received via the second end 408.

The adapter 312 can be coupled to the cradle 304 in either of the above-mentioned orientations via a cradle interface on an outer surface of the perimeter wall 400. The cradle interface includes one or more structural elements on the perimeter wall 400 that removably engage with complementary structural elements of the cradle 304, to restrict movement of the adapter 312 relative to the cradle 304.

In the illustrated example, the cradle interface includes central portions 424-1, and 424-2 of the side walls 400-1 and 400-2, each of which bear one of more protrusions such as tabs 428. The cradle interface is reversible, in that the cradle interface engages with the cradle 304 in either of the above orientations. In this example, therefore, the adapter 312 includes distinct tabs 428 or pairs of tabs 428 adjacent to each of the ends 404 and 408. At least a subset of the tabs 428 engages with the cradle 304 in each orientation. In other examples, the same set of tabs 428 or other protrusions can engage with the cradle 304 in either orientation. The adapter 312 can include visual indicators 430, e.g., depicting the device configurations corresponding to each device interface. Thus, the illustrated indicators 430 indicate which end 404 or 408 of the adapter 312 should be placed facing upwards (away from the cradle 304) to accommodate which device configuration.

The cradle 304, meanwhile, includes an adapter interface configured to engage with the above-mentioned cradle interface of the adapter 312. Specifically, in the illustrated example, the cradle 304 includes a channel extending from a floor surface 432 to an upper end 436, e.g., defined by side walls 440-1 and 440-2. Inner surfaces 444 (the inner surface 444-2 is visible in FIG. 4) of the side walls 440 are configured to engage with the corresponding central portion 424 of the adapter 312, e.g., via ribs 448 extending into the channel of the cradle 304. The adapter interface of the cradle 304 can also include alignment structures, such as fins 452 extending into the channel, e.g., from a central pillar 456 carrying the connector 308. The fins 452 can engage with corresponding guide walls 458 of the adapter 312, to align the adapter 312 during coupling to the cradle 304.

As will now be apparent, when the adapter 312 is inserted into the channel of the cradle 304, the end 408 of the perimeter wall 400, specifically at the central portions 424, rests on the floor surface 432, with the central portions 424 engaging the inner surfaces 444 of the cradle 304. Further, at least a subset of the tabs 428 can engage with corresponding ridges 460 extending into the channel of the cradle 304, to retain the adapter 312 within the channel. The central portions 424 may be sufficiently flexible to be deformed (e.g., by a user) to disengage the tabs 428 from the ridges 460 to allow removal of the adapter 312.

Figure 5:
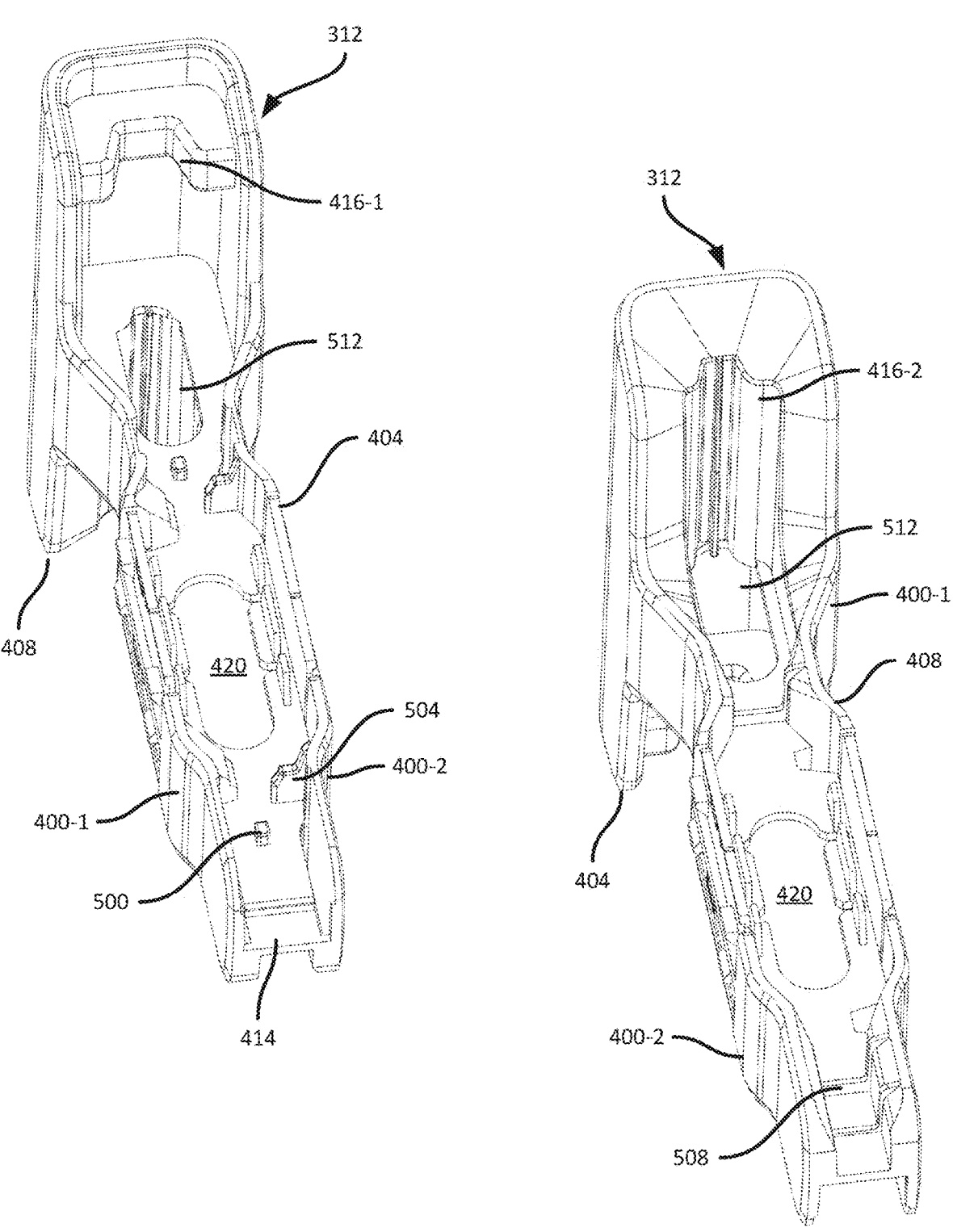
FIG. 5 is a diagram illustrating the adapter of the system of FIG. 3 in isolation.

FIG. 5 illustrates the adapter 312 in isolation, in each of a first orientation (on the left, and corresponding to the orientation shown in FIG. 4) and a second orientation (on the right). As seen from FIG. 5, the two orientations of the adapter 312 are opposed to one another, with each being upside down relative to the other. As also shown in FIG. 5, the engagement surfaces 416-1 and 416-2 have distinct surface profiles. In particular, the profile of the surface 416-2 defines a narrower portion of the channel 412 than the profile of the surface 416-1. The surface 416-2 is shaped and dimensioned to engage with the device 100 alone, while the surface 416-1 is shaped and dimensioned to engage with the device 100 and the cover 116 together.

Additional features of the above-mentioned device interfaces are also shown in FIG. 5. In particular, each device interface can include one or more protrusions on the boundary wall 414. For example, the adapter 312 can include one or more posts 500, and/or one or more buttresses 504 extending from one side of the boundary wall 414, to engage with the device 100 and/or the cover 116. The opposite side of the boundary wall 414 can include a distinct set of protrusions, such as ledges 508, to engage with the device 100. In addition, the boundary wall 414 can include an additional opening 512 therethrough, e.g. to accommodate features of the cover 116 (e.g., corners thereof) that would otherwise impact the boundary wall 414.

Figure 6:
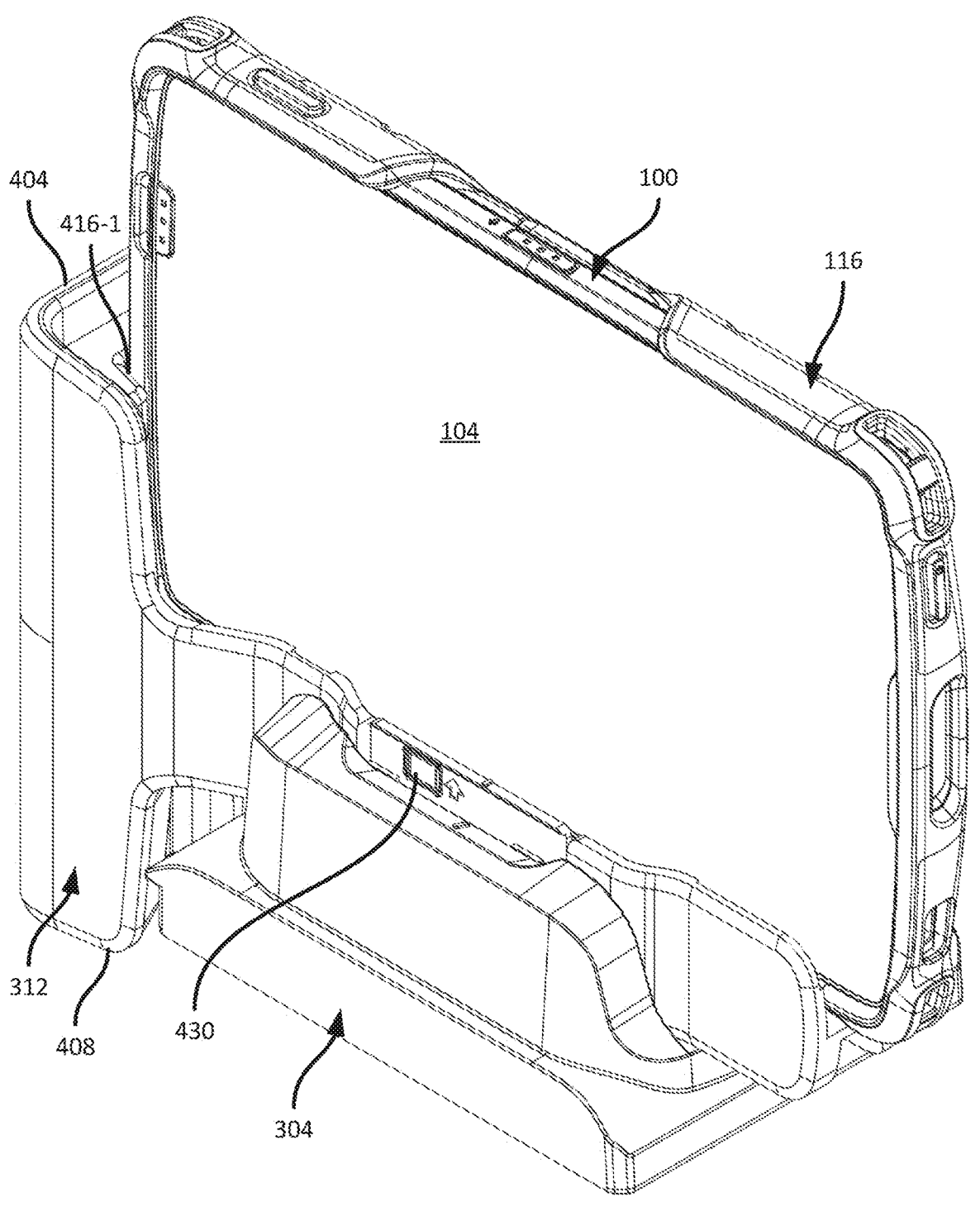
FIG. 6 is a diagram illustrating the system of FIG. 3 with the device and cover of FIG. 2 received therein.

FIG. 6 illustrates the adapter 312 coupled to the cradle 304 to place the above-mentioned first device interface (e.g., the engagement surface 416-1) in the active orientation. The device 100, with the cover 116, has then been inserted into the adapter 312, which aligns the connector 108 of the device 100 with the connector 308 of the cradle 304, and restricts movement of the device 100 relative to the cradle 304. As will be apparent, the system 300 can be reconfigured to accommodate the device 100 alone (i.e., without the cover 116), by removing the device 100, decoupling the adapter 312 from the cradle 304, reversing the orientation of the adapter 312, and re-coupling the adapter 312 to the cradle 304.

The adapters 312 as described above may be specific to a given set of device configurations. For example, the adapter 312 may enable the cradle 304 to accommodate both the device 100 alone and the device 100 with the cover 116, but a separate adapter may be provided for another device and corresponding cover. The other device may, for instance, be a larger or smaller version of the device 100, e.g. with a greater length than the length 128, but the same thickness.

In other embodiments, the system 300 can include an adapter configured to accommodate not only device configurations including and excluding a cover such as the cover 116, but also device configurations with multiple distinct device sizes. For example, the display 104 of the device 100 can have a size (e.g., measured diagonally) of eight inches. An adapter may be provided that is capable of accommodating four distinct device configurations: the two configurations shown above (i.e., the device 100, and the device 100 with the cover 116), a third configuration consisting of a ten-inch version of the device 100, and a fourth configuration consisting of the ten-inch device with a corresponding cover.

Figure 7:
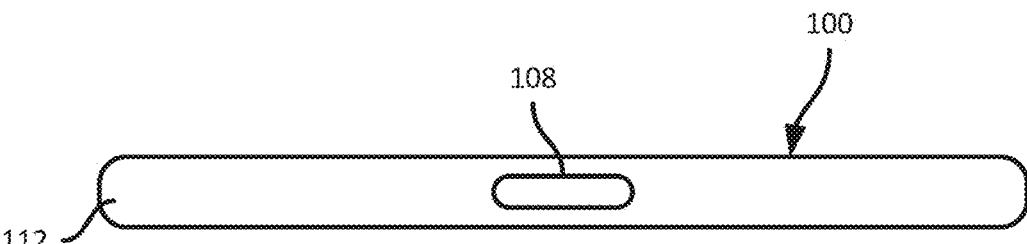
FIG. 7 is a diagram illustrating bottom edges of the device of FIG. 1, and a further device.
Figure 7:
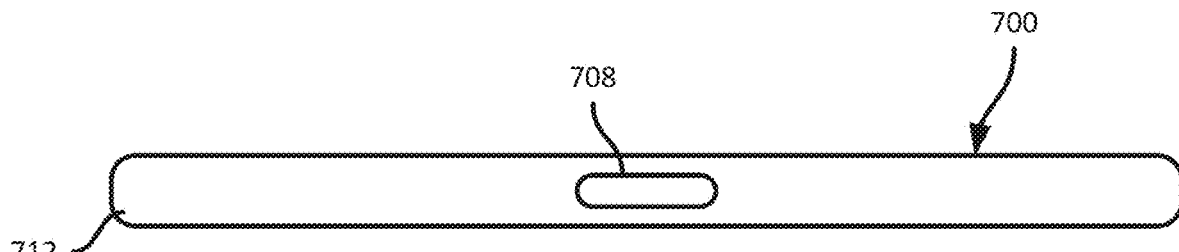

Referring to FIG. 7, the bottom edge 112 of the device 100 is shown, as well as the connector 108. In addition, a bottom edge 712 of a larger device 700 (e.g., the above-mentioned ten-inch version of the device 100) is also illustrated. The device 700 includes a connector 708 which may be structurally identical to the connector 108, but whose distance from either side of the bottom edge 712 is different from the distance between the connector 108 and the sides of the bottom edge 112.

Figures 8, 9:
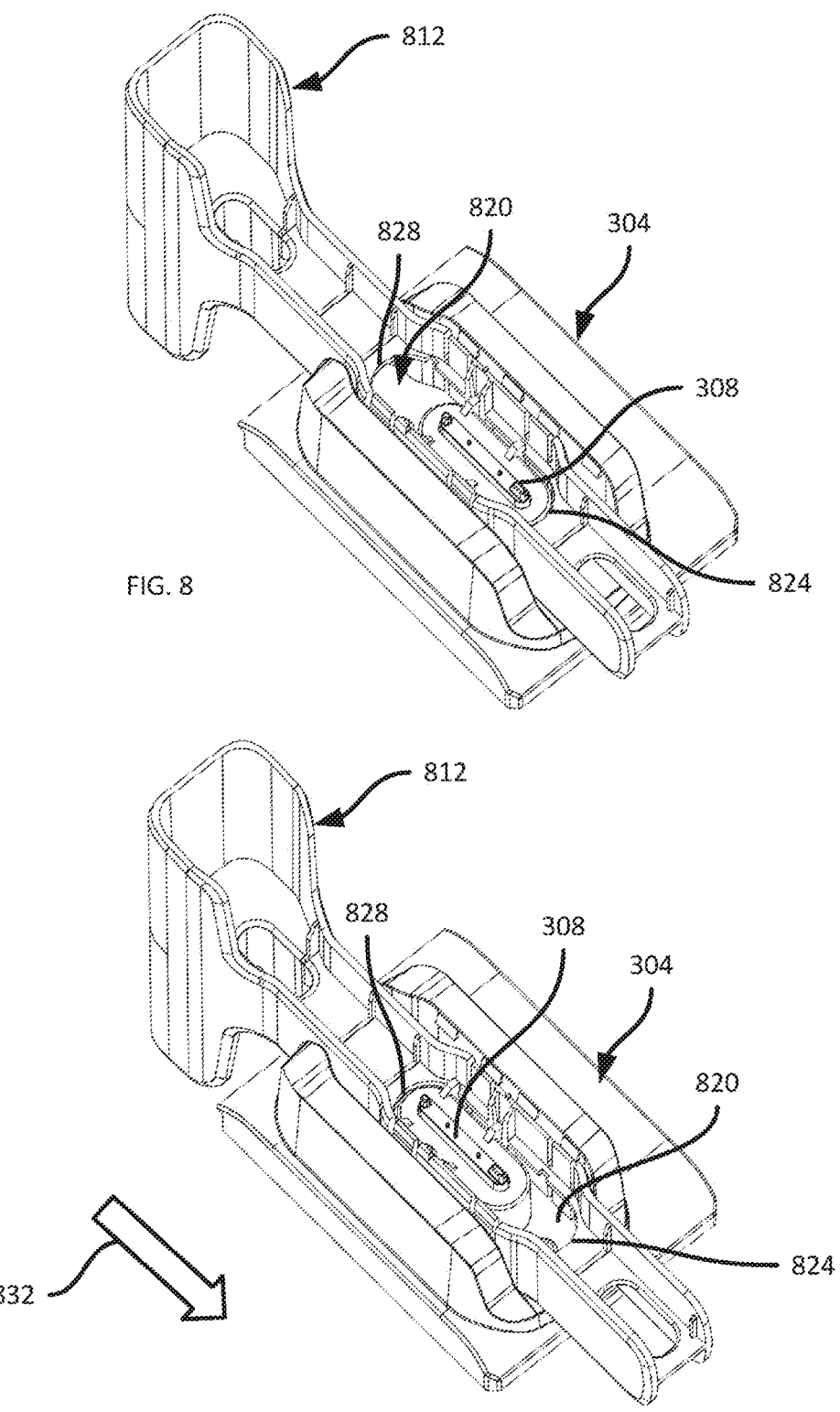
FIG. 8 is a diagram illustrating a charging cradle adapter system configured to accommodate the devices of FIG. 7, shown in a first configuration.
FIG. 9 is a diagram of the charging cradle adapter system of FIG. 8 in a second configuration.

To accommodate both devices 100 and 700, e.g., with or without corresponding covers, an adapter may be provided with a cradle interface configured to couple the adapter to the cradle 304 in either of two distinct positions. FIGS. 8 and 9 illustrate an example adapter 812 sharing certain features with the adapter 312 as described above, and including additional features enabling connection with the cradle 304 at two distinct positions. In particular, the adapter 812 includes an opening 820, analogous to the opening 420 of the adapter 312, that is greater in length than the connector 308. The cradle interface of the adapter 812 can therefore connect to the cradle 304 in at least two distinct positions. A first position, shown in FIG. 8, accommodates the device 700, while the second position, shown in FIG. 9, accommodates the device 100. In the first position (FIG. 8), the connector 308 is at a first end 824 of the opening 820 (e.g., abutting with the first end 824), leaving a second end 824 of the opening 820 disengaged from the connector 308. In the second position (FIG. 9), the adapter 812 is shifted in a direction 832 to engage the connector 308 with the second end 828, leaving the first end 824 disengaged from the connector 308.

The adapter 812 can also, in some examples, be configured to couple to the cradle 304 at additional positions beyond those mentioned above. That is, in some examples the adapter 812 can be coupled such that both the ends 824 and 828 are disengaged from the connector 308, e.g., to accommodate a device with a length in between the lengths of the devices 100 and 700 as shown in FIG. 7.

The adapter 812, as mentioned above, is reversible to accommodate device configurations with and without covers. In other implementations, the adapter 812 need not be reversible, and can instead be configured to accommodate only distinct lengths of device, without also accommodating covers.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. An adapter for a charging cradle, the adapter comprising:
a plurality of device interfaces corresponding to respective configurations of a mobile device; and
a cradle interface configured to connect the adapter to the charging cradle in a plurality of orientations.

2. The adapter of claim 1, wherein:
a first configuration of the mobile device corresponds to the mobile device and an exoskeleton, and
a second configuration of the mobile device corresponds to the mobile device excluding the exoskeleton.

3. The adapter of claim 1, wherein the cradle interface includes a tab configured to engage with a corresponding ridge of the charging cradle.

4. The adapter of claim 3, wherein a portion of the cradle interface is flexible to disengage the tab from the ridge for removal of the adapter from the charging cradle.

5. The adapter of claim 1, wherein:
the mobile device has a first length or a second length, and
the cradle interface is configured to couple the adapter to the charging cradle at one of (i) a first position corresponding to the first length, or (ii) a second position corresponding to the second length.

* * * * *